(12) United States Patent
Hegli

(10) Patent No.: US 8,561,187 B1
(45) Date of Patent: Oct. 15, 2013

(54) SYSTEM AND METHOD FOR PROSECUTING DANGEROUS IP ADDRESSES ON THE INTERNET

(75) Inventor: Ron Hegli, San Diego, CA (US)

(73) Assignee: Webroot Inc., Broomfield, CO (US)

( * ) Notice: Subject to any disclaimer, the term of this patent is extended or adjusted under 35 U.S.C. 154(b) by 48 days.

(21) Appl. No.: 13/249,173

(22) Filed: Sep. 29, 2011

Related U.S. Application Data

(60) Provisional application No. 61/388,582, filed on Sep. 30, 2010.

(51) Int. Cl.
  *H04L 29/06* (2006.01)
(52) U.S. Cl.
  USPC ............................................................ 726/22
(58) Field of Classification Search
  None
  See application file for complete search history.

(56) References Cited

U.S. PATENT DOCUMENTS

| | | | |
|---|---|---|---|
| 2008/0301809 A1* | 12/2008 | Choi | 726/23 |
| 2009/0158416 A1* | 6/2009 | Statia | 726/12 |
| 2010/0064366 A1* | 3/2010 | Zhang | 726/22 |
| 2010/0082811 A1* | 4/2010 | Van Der Merwe et al. | 709/225 |
| 2010/0095374 A1* | 4/2010 | Gillum et al. | 726/22 |
| 2011/0154489 A1* | 6/2011 | Jeong et al. | 726/22 |
| 2011/0185423 A1* | 7/2011 | Sallam | 726/23 |
| 2011/0277034 A1* | 11/2011 | Hanson | 726/25 |
| 2011/0283349 A1* | 11/2011 | Wu | 726/11 |

* cited by examiner

*Primary Examiner* — Gilberto Barron, Jr.
*Assistant Examiner* — Izunna Okeke
(74) *Attorney, Agent, or Firm* — Sheridan Ross P.C.

(57) ABSTRACT

A method and system for prosecuting threatening IP addresses on the Internet and publishing a list of these threatening IP addresses for users to block is disclosed herein. If the IP address behaves properly according to a policy adhered to by the users, then the IP address may be paroled and removed from the list.

21 Claims, 15 Drawing Sheets

SYSTEM AND METHOD FOR PROSECUTING DANGEROUS IP ADDRESSES ON THE INTERNET

CROSS REFERENCE TO RELATED APPLICATION

The present application claims priority to U.S. Provisional Patent Application No. 61/388,582, filed on Sep. 30, 2010, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to identifying threat IP addresses ("threat IP's") on the internet and publishing information about threat IP's for consumption by network management products and network administrators to manage risk in network communications.

2. Description of the Related Art

The threat landscape is constantly changing, from the actors involved, as identified by IP addresses, URLs, and files, to the vectors of attack that they employ. As technology evolves, adding new paradigms such as cloud computing or social networking, new opportunities are created for exploitation by these bad actors. The key vector of attack is the web.

The motivation for 'hacking' or attacks upon vulnerable networks has also evolved, from simple notoriety and bragging rights to profit, which has significantly increased the investment in malicious software design and implementation, leading to more sophisticated and difficult to detect attacks.

Enterprises, and even the security solutions vendors themselves, have limited visibility into all of the malicious activity occurring on the internet, so there is a need to share data to increase visibility and gain better protection against a broader range of attacks.

Definitions for various terms are set forth below. Domain Name System ("DNS") translates Internet domain names into numerical IP addresses.

HyperText Markup Language (HTML) is a method of mixing text and other content with layout and appearance commands in a text file, so that a browser can generate a displayed image from the file.

Hypertext Transfer Protocol (HTTP) is a set of conventions for controlling the transfer of information via the Internet from a Web server computer to a client computer, and also from a client computer to a Web server.

Internet is the worldwide, decentralized totality of server computers and data-transmission paths which can supply information to a connected and browser-equipped client computer, and can receive and forward information entered from the client computer.

Internet protocol (IP) is an address is the numerical reference for any device on a computer network using an Internet Protocol for communication between communication nodes.

Sub-domain is a label to the left of a top level domain of a domain name such as www. uspto.gov wherein uspto is a sub-domain.

Top level domain is the right most portion of a domain name such as www uspto.gov wherein .gov is the top level domain.

URL or Uniform Resource Locator is an address on the World Wide Web.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, CHROME, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access. Servers usually contain one or more processors (CPUs), memories, storage devices and network interface cards. Servers typically store the HTML documents and/or execute code that generates Web-pages that are sent to clients upon request. An interactive-form information-collection process generally is controlled from a server computer, to which the sponsor of the process has access.

Thus, there is a need to identify threatening events emanating from IP addresses in real-time, or as close as possible thereto, in order to warn network management products and network administrators of these threatening IP addresses.

BRIEF SUMMARY OF THE INVENTION

The present invention is directed at a broad-based threat identification, not a niche solution for spam or other specific attack vector.

The present invention utilizes first-hand observations of network activity originating from remote IP addresses, and analyzes those observations to identify threat behavior. Specially designed sensors are deployed within a wide variety of networks worldwide in order to make those observations. In addition, third-party sources of network observations are combined with the first-hand observations in order to augment the overall visibility of the system.

One aspect of the present invention leverages web content information where possible, including characterization of remote IP web requests for content type and security profile, as well content and reputation information for domain(s) which may be associated with the remote IP itself.

Another aspect of the present invention is a cloud based system that utilizes sensors that push events as the events occur into the cloud, versus periodic "pulling: of the data from a collector process—resulting in "real-time" collection. Observations are preferably stored in one hour buckets for later prosecution.

This aspect of the present invention is scalable and utilizes "HADOOP" technology to process each hour's observations in a highly parallel way, grouping observations by originating IP address, and continually processing each hour of data at the conclusion of each hour. Raw observations are preferably stored in AMAZON's S3 storage service. Another incarnation stores the data in a CASSANDRA database. Key behavior metrics are defined and calculated for each IP address, and rules are written in terms of the metrics.

While one embodiment of the present invention utilizes standard SQL databases in a central datacenter to process the raw threatening events data, another embodiment implements security rules as Map/Reduce jobs—and preferably utilizes AMAZON's S3 storage, which processes data faster and is more scalable. Then operating on that data using "HADOOP Technology", which is analyzing the raw threatening events data using a configurable set of servers/processors clustered together, allowing fast processing even as the raw threatening event data increases to very high volumes.

The system preferably continuously runs MapReduce jobs operating hour by hour on data sent from sensors positioned throughout the world. A determination of threat behavior (aka conviction decisions) are preferably based on one-hour, two-hours, and twelve-hours aggregated data.

The threat IP verification process of the present invention involves comparison of an IP address to a whitelist (immunity list or list of known non-threatening IP addresses) which prevents publishing of the IP address. The threat IP verification process also analyzes an associated Host/Domain reputation by performing a reverse DNS lookup to find host(s) associated with the IP, performing a lookup of the host(s) in a URL database to determine a reputation score and content, count sub-domains within host name (a.b.c.d.e.domain-.com=7) then, determine if the reputation score is high and the sub-domain count=2, the IP address is not published.

The threat IP aging process of the present invention reviews the punishment to determine if the IP address should be removed from the threat list (paroled). The blacklist (prison time) is based on several factors: threat behavior (crime committed); overall level of activity originating from the threat IP; threat record (criminal record)—incrementally extend time based on number of threat 'convictions' within specific timeframes; network reputation—the number of threat IP's identified with the same network as the IP in question. The IP address is removed from the published list (prison) when the 'sentence' is complete.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
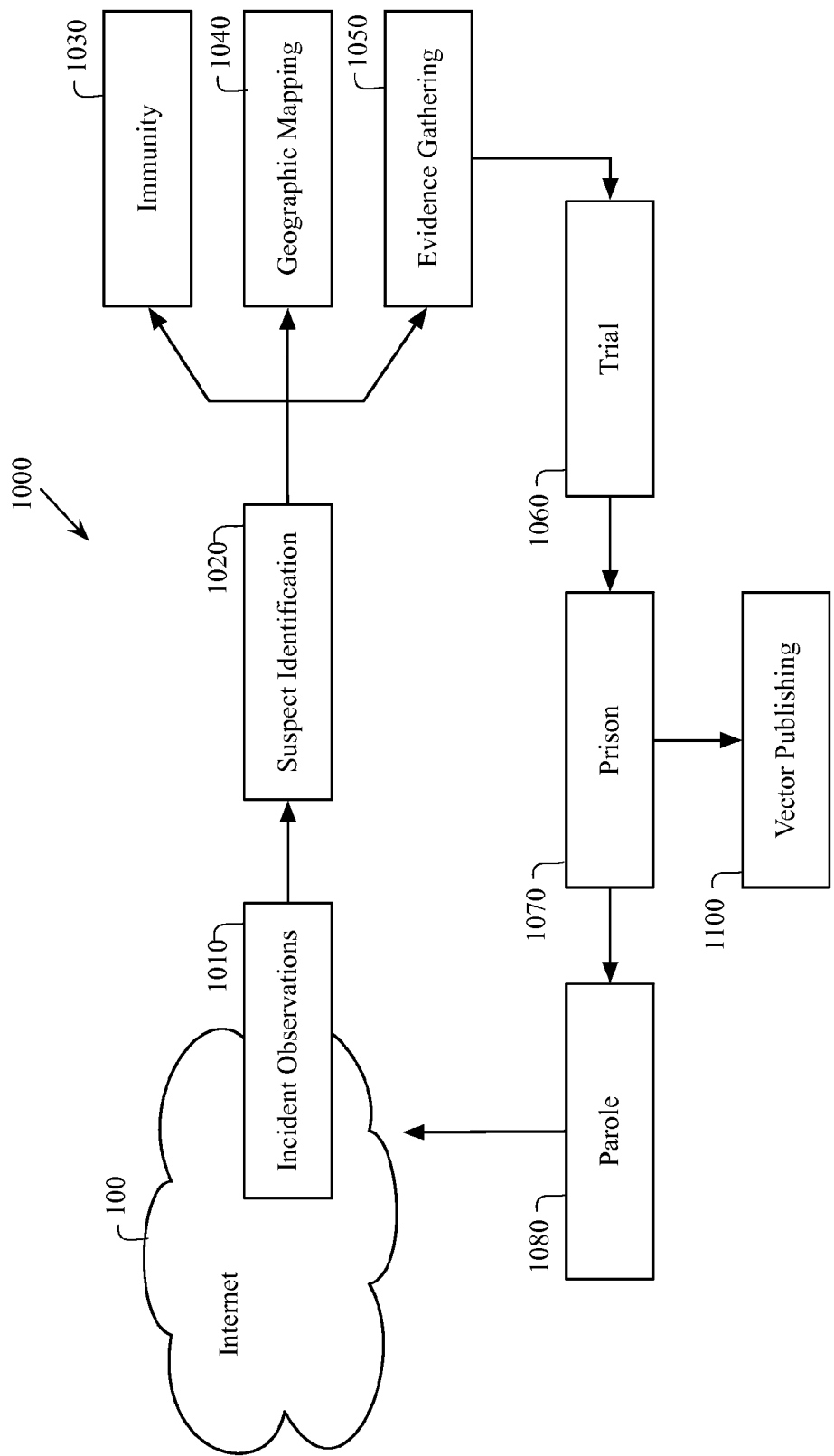
FIG. 1 is a flow chart of a general method for identifying and prosecuting threatening IP addresses.

FIG. 1 is a flow chart of a general method 1000 for identifying and prosecuting threatening IP addresses. From the Internet 100, at block 1010, incident observations are made by sensors positioned at multiple locations for accessing the Internet. At block 1020, a suspect IP address is identified and the data for the suspect is sent to a prosecution server for analysis. At block 1030, if the suspect IP address has immunity the inquiry ends. At block 1040, geographic mapping of the suspect IP address is determined. At block 1050, evidence is gathered against the suspect for the "trial." At block 1060, the "trial" is conducted at a prosecution server. At block 1070, the suspect is sentenced to prison which means Vector publishing at 1100. At block 1080, the suspect is granted parole.

The following terms are defined for use in this application. The terms utilized are related to criminal prosecution and are meant to convey the seriousness of the activity, however, the system and method of the present invention do not involve criminal prosecution by the government against defendants.

Incidents—Network events, from simple connections to more complex.

Suspects—IP's responsible for network events.

Evidence—Data surrounding an incident, or sequence of incidents.

Laws—Rules describing criminal network behavior.

Trial—Application of Laws (rules) to evidence against a suspect.

Convicts—Suspect IP's which have violated a law and are in "prison."

Parole—Removal of convict IP's from prison, no longer published as bad.

Immunity—IP's which cannot be sent to prison (e.g. BrightCloud corp).

The various laws, or rules, identify the following threat behavior categories.

Spam Sources: origination of spam email; SpamCloud, BrightNet.

Windows Exploits—high volume of exploiters, probers: SMB (file and print), RPC, SQL server; malware propagation; and botnet expansion.

Web-based Attacks—anonymization for click fraud, malware; web-based database, email access; website vulnerability probing; and email harvesting.

Botnets: command and control; known membership; zombie behavior; spam forwarding; malware propagation.

Scanners: non-specific probing across multiple TCP ports and sensors.

Networks: reputation-based blocking based on near-network threat activity.

The present invention preferably uses multiple sensor techniques to observe threatening events globally in order to gather evidence against or for a particular IP address. One such sensor technique is semi-open proxy farms that detect key threats such as click fraud and botnets. Another sensor technique preferably employed by the present invention is the use of "honeypots" that detect key threats such as WINDOWS exploits. Another sensor technique preferably employed by the present invention is the use of naïve user simulations that detect key threats such as Botnets or Trojans. Another sensor technique preferably employed by the present invention is the use of web app honeypots that detect key threats such as SQL injections. Another sensor technique preferably employed by the present invention is the use of spam traps that detect key threats such as spam sources or spam URLs. Another sensor technique preferably employed by the present invention is the use of Bot detectors that detect key threats such as Botnets. Another sensor technique preferably employed by the present invention is the use of third party sources that detect various key threats. Those skilled in the pertinent art will recognize that other sensor techniques may be employed without departing from the scope and spirit of the present invention.

Figure 2:
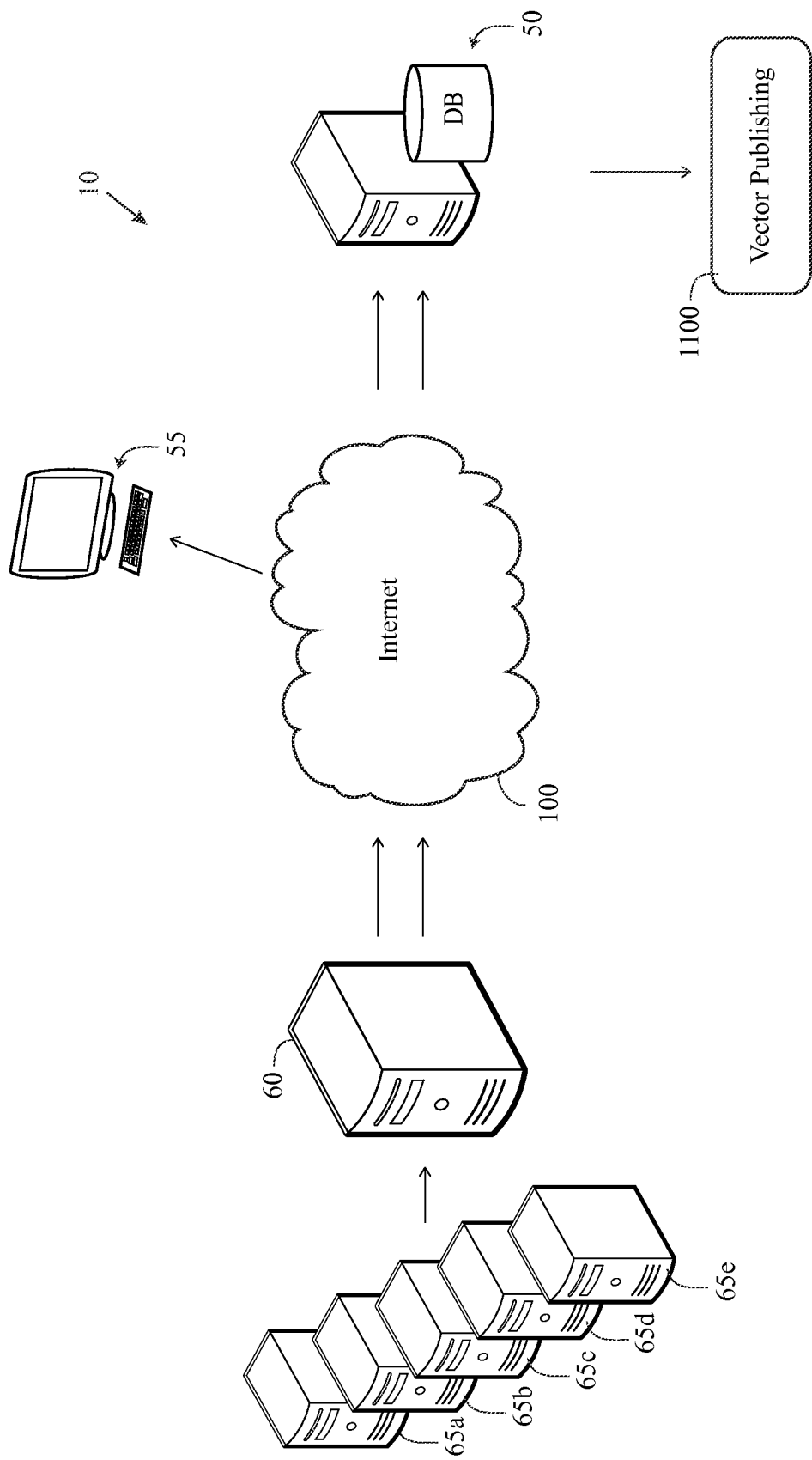
FIG. 2 is a block diagram of a system for identifying and prosecuting threatening IP addresses.

FIG. 2 is a block diagram of one embodiment of a system 10 for identifying and prosecuting threatening IP addresses. A threat database 50 is preferably located at a threat detection server site and the threat database 50 receives data over the Internet 100 and transfers Web content reports over the Internet 100 to a client 55. The system 10 preferably includes a proxy master web filtering host 60 which controls and collects evidence and other data from a plurality of cloud based slave proxies 65a, 65b, 65c, 65d and 65e. This system 10 preferably detects threats such as click-fraud, Botnets and malware. In this system 10, if an IP address is "convicted" of harmful or dangerous behavior, then the IP address is published on the list at vector publishing 1100. The list is constantly updated to add and remove IP addresses. The list is utilized to determine which IP addresses should be blocked or avoided by Internet users.

Figure 3:
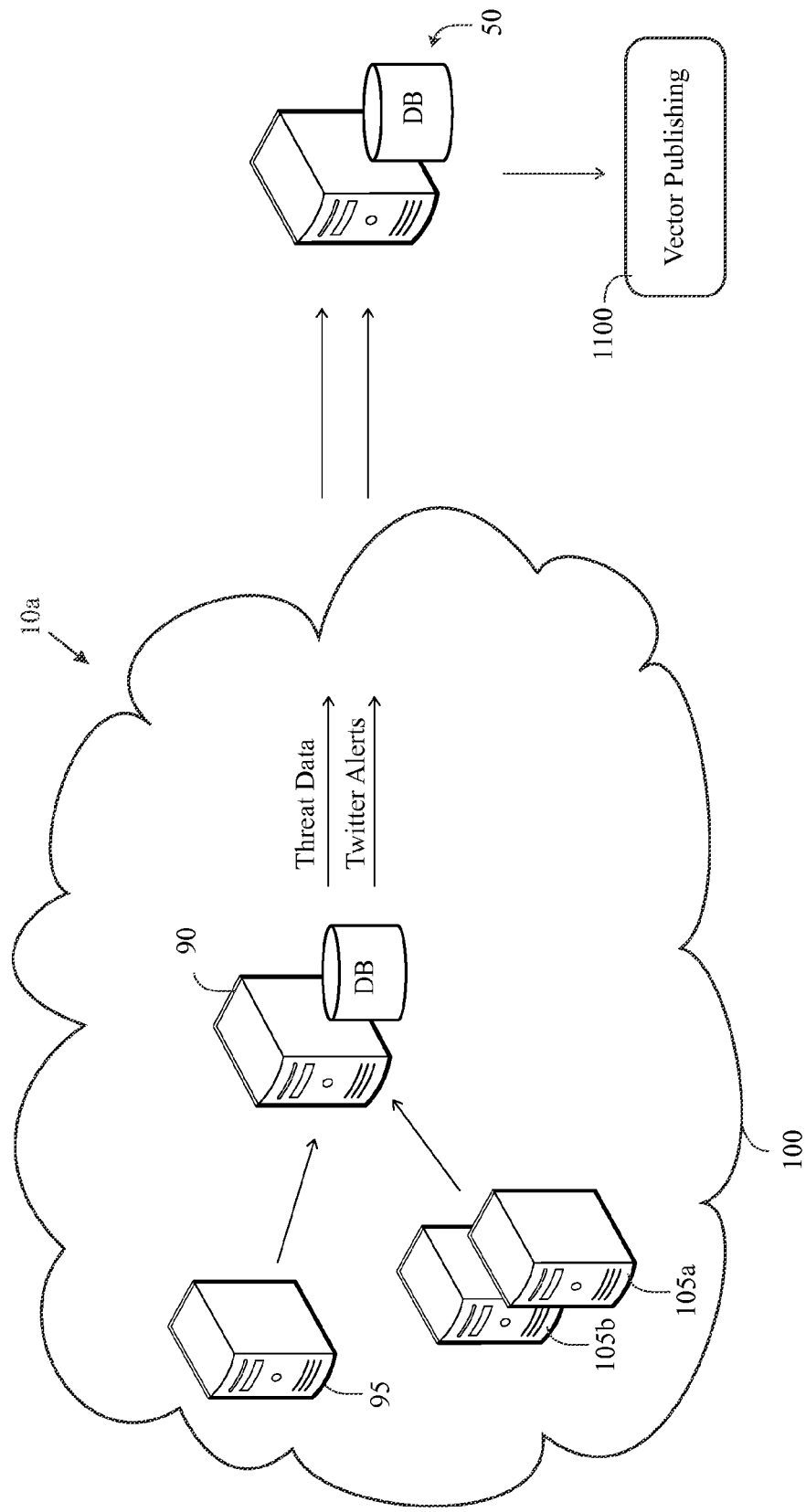
FIG. 3 is a block diagram of a system for identifying and prosecuting threatening IP addresses.

FIG. 3 is a block diagram of another embodiment of a system 10a for identifying and prosecuting threatening IP addresses. A threat database 50 is preferably located at a threat detection server site and the threat database 50 receives data over the Internet 100. This system 10a preferably detects threatening events such as SQL injection attacks, local file inclusion attacks, DDoS attacks and dictionary attacks. The system 10a preferably includes a central SIA database 90 which controls and collects evidence and other data from a plurality "Glastopf honeypots" 105a and 105b and a "honeypot" 95. The "honeypot" 95 searches for SQL injection phishing sites and the Glastopf honeypots" 105a and 105b search for evidence of open source web attacks. In this system 10a, if an IP address is "convicted" of harmful or threatening behavior, then the IP address is published on the list at vector publishing 1100.

Figure 4:
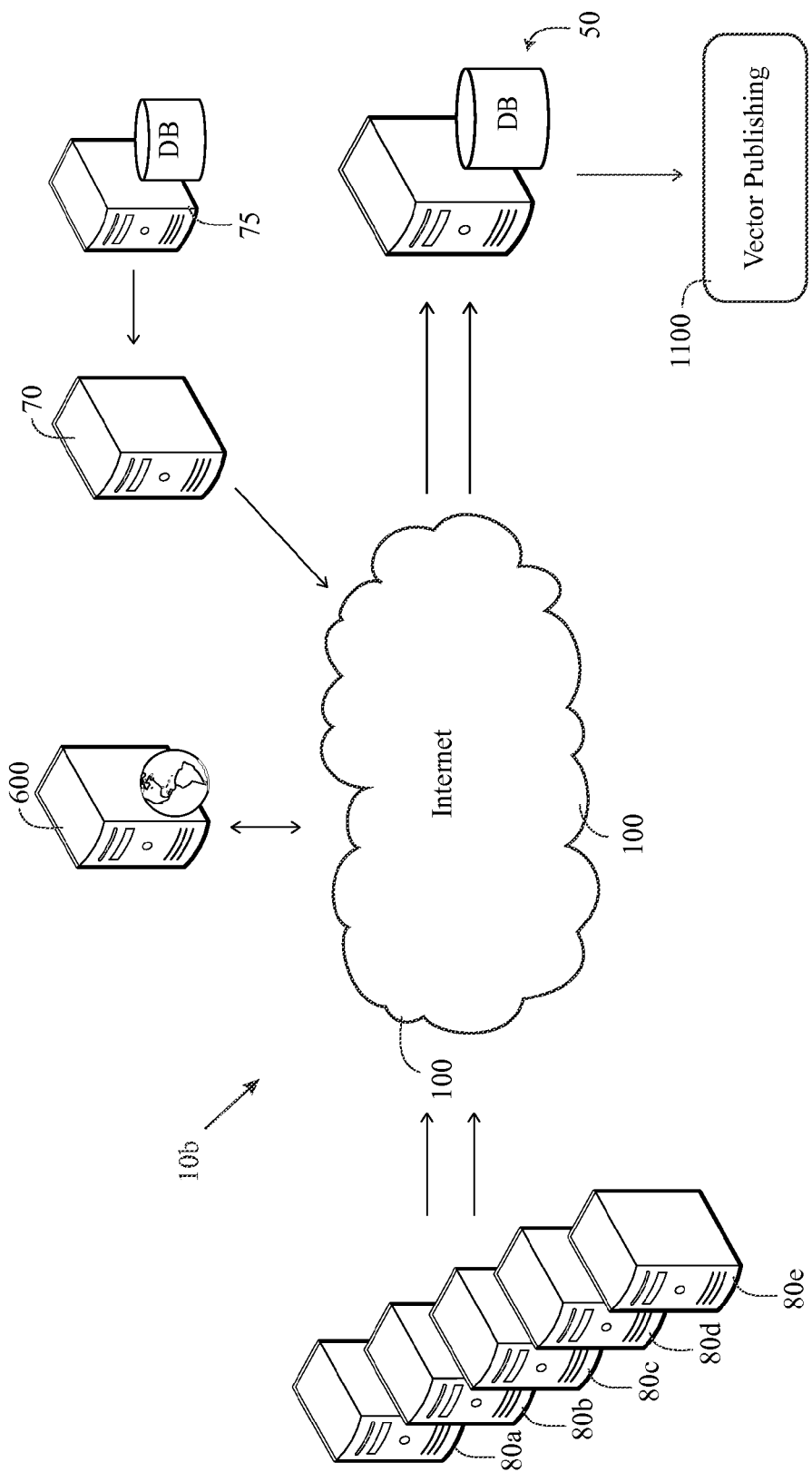
FIG. 4 is a block diagram of a system for identifying and prosecuting threatening IP addresses.

FIG. 4 is a block diagram of another embodiment of a system 10b for identifying and prosecuting threatening IP addresses. A threat database 50 is preferably located at a threat detection server site and the threat database 50 receives data over the Internet 100. This system 10b preferably detects threatening events such as Trojans, Botnets and various WINDOWS exploits. The system 10b preferably includes "monkey" clients 80a, 80b, 80c, 80d and 80e that visit infected or malicious web sites 600 over the Internet 100. Target Web sites to visit are provided by a URL server 70 which receives data from a BCAP service 75. A snort IDS analyzes all of the client traffic and logs imported analyzed data for transfer to the threat database 50. In this system 10b, if an IP address is "convicted" of harmful or threatening behavior, then the IP address is published on the list at vector publishing 1100.

Figure 5:
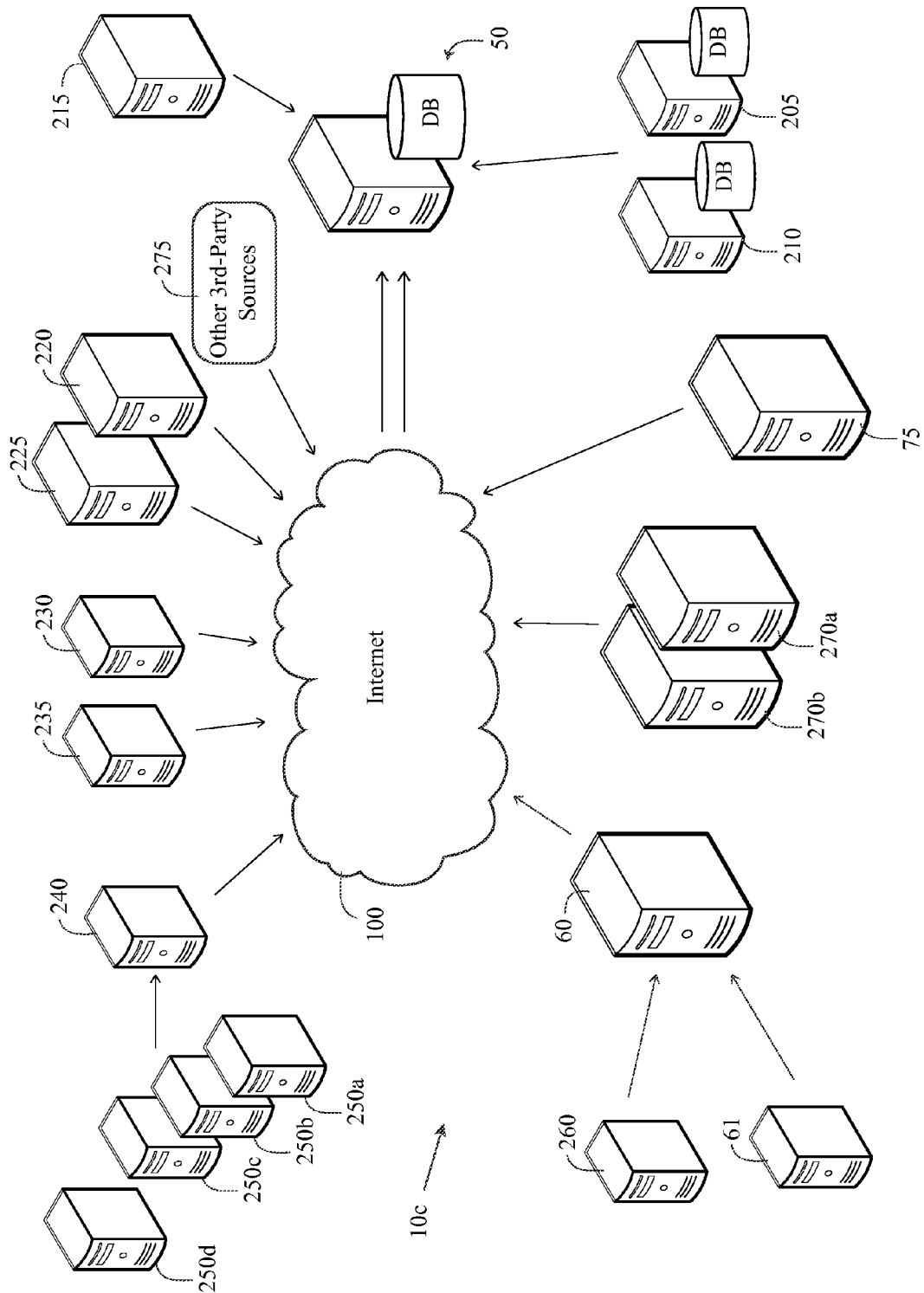
FIG. 5 is a block diagram of a system for identifying and prosecuting threatening IP addresses.

FIG. 5 is a block diagram of an alternative embodiment of a system 10c for identifying and prosecuting threatening IP addresses. A threat database 50 is preferably located at a threat detection server site and the threat database 50 receives data over the Internet 100. This system 10c preferably detects threatening events such as click fraud, malware, Trojans, Botnets, various WINDOWS exploits, SQL injection attacks, local file inclusion attacks, DDoS attacks and dictionary attacks. The system 10c preferably includes "monkey" clients 270a and 270b that visit infected or malicious web sites, a proxy master web filtering host 60 which controls and collects evidence and other data from a plurality of cloud based slave proxies 260 and 61. Target Web sites to visit are provided by a BCAP service 75. The system 10d also has VPS sensors 250a-d which transmit data to a SIA 240. The system 10d also has Honeypots 230 and 235, open source lists from a DShiel 225 and a Honeypot 220. The system 10c also collects data from a spamcloud 215, Geo database 210 and a port 205. In this system 10c, if an IP address is "convicted" of harmful or threatening behavior, then the IP address is published on the list at vector publishing 1100.

Figure 6:
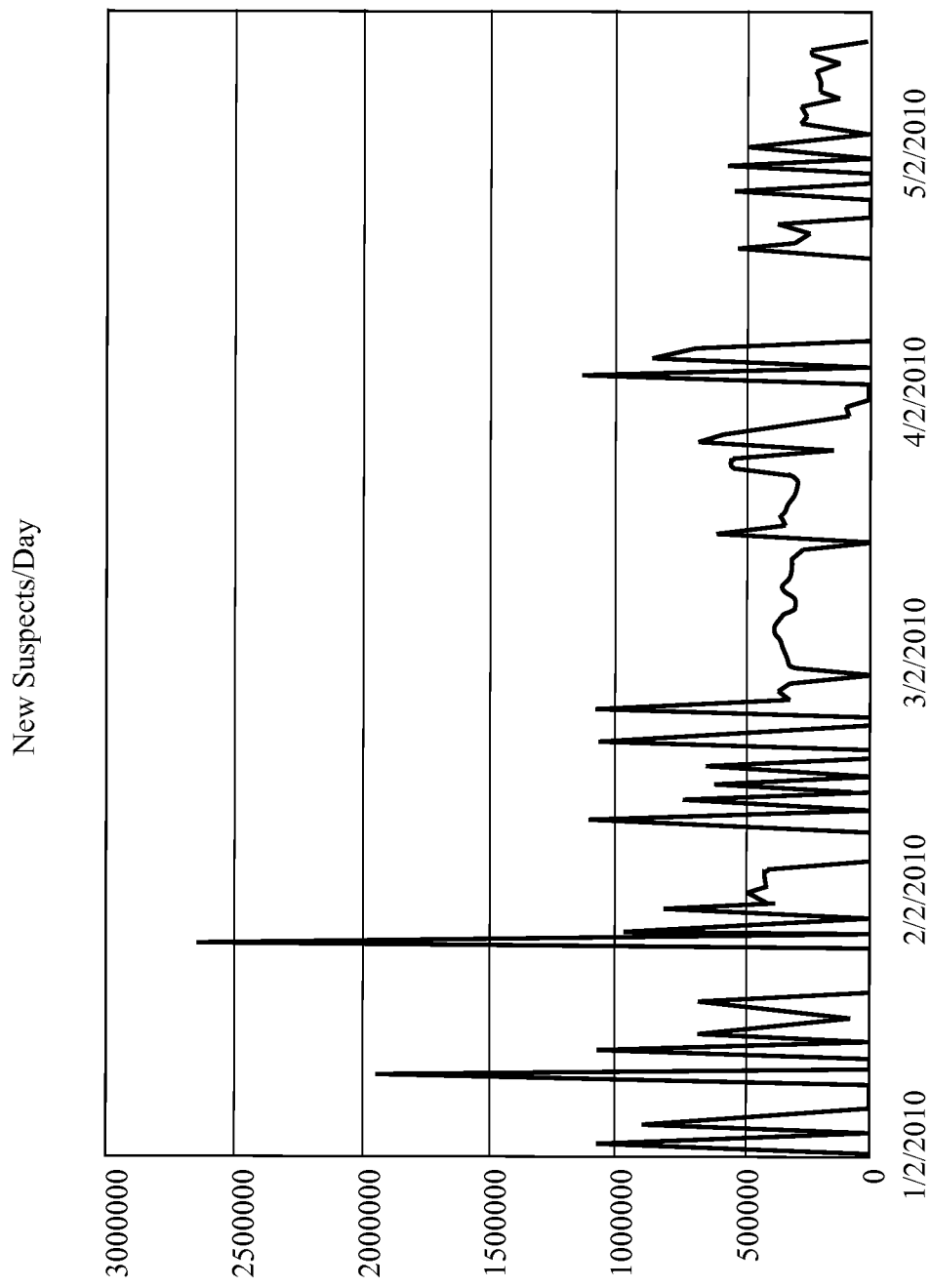
FIG. 6 is a graph of new suspects each day.

New suspect IP addresses that emanate threatening events are detected each day as shown in FIG. 6.

In the examples below, the headings are: Id—record id number; IP_address—the integer form of the internet protocol address; Local_port—the TCP port number at the sensor end of the connection; Occurred—the time and date that the security incident occurred; Rep—BrightCloud reputation index, from 0(high risk) to 100(lowest risk); Crime_id=ID's of various threat behaviors, determined from collected threatening events. Publish—True/False value indicating whether the IP address, shown to be a threat, should actually be published. Sentenced—the time and date when the IP was determined to be a threat.

Example One

The security incidents below were collected for IP address 3370231457, equivalent to 200.225.166.161. From the threatening events database, a server associated with walmart.com

TABLE ONE

| ID | IP ADDRESS | LOCAL PORT | OCCURRED | SENSOR ID |
|---|---|---|---|---|
| 31901 | 3370231457 | 25 | 2010-05-22 17:00:31 | 1006 |
| 1920202 | 3370231457 | 445 | 2010-06-07 13:56:00 | 1006 |
| 3147983 | 3370231457 | 445 | 2010-06-20 19:54:49 | 1006 |
| 6430233 | 3370231457 | 445 | 2010-07-16 22:41:03 | 1006 |

These threatening events involved connection attempts at port 25, which indicates an attempt to propagate spam email, and port 445, which indicates a probe for a WINDOWS vulnerability. A reverse DNS lookup on IP address 3370231457 returns 'walmart.com'. The system looks up a variety of other information based on the IP address and domain name as well, storing it in a 'background' information table:

suspect IP: 370231457.

hostname: walmart.com.

rep: 92.

country: BR.

crime id: 414 sentenced: 2010-07-17 07:41:26 publish: 0

The fact that the domain is a simple (without multiple sub-domains) and the reputation score for the domain is 92/100, the system decides not to publish this IP address (publish=0/False). Blocking walmart.com is generally undesirable, and the data suggests that some node or nodes behind a firewall at this address are compromised, but that walmart.com itself is not a threat.

Example Two

For the college board.

TABLE TWO

| ID | IP ADDRESS | LOCAL PORT | OCCURRED | SENSOR ID |
|---|---|---|---|---|
| 3650100 | 1086313361 | 46231 | 2010-06-21 19:59:00 | 1006 |
| 10122869 | 1086313361 | 35670 | 2010-08-10 18:24:27 | 1006 |
| 10122914 | 1086313361 | 35783 | 2010-08-10 18:24:55 | 1006 |

These threatening events indicate probes at a few different TCP ports, which could be indicative of Botnet propagation attempts. IP address 1086313361 translates to collegeboard.

com via reverse DNS. The background information on this domain was: suspect IP: 1086313361.

hostname: collegebaord.com.
    rep: 92
    crime_id: 101
    sentenced: 2010-08-12 07:39:47.
    publish: 0

Again, with a simple, high-reputation domain associated with it, the system does not publish this IP address as a threat.

Example Three

Another example is goldscape.net.

TABLE THREE

| ID | SUSPECT_IP | SUSPECT DOMAIN | HTTP_METHOD |
|---|---|---|---|
| 7964219 | 2057704624 | Goldscape.net | GET |
| 7964220 | 2057704624 | Goldscape.net | GET |
| 7964221 | 2057704624 | Goldscape.net | GET |

TABLE FOUR

| URL | OCCURRED | SENSOR_ID |
|---|---|---|
| //includes/general.js | 2010-06-23 19:30:45 | 1012 |
| //zencart/includes/general.js | 2010-06-23 19:30:47 | 1012 |
| //admin/includes/general.js | 2010-06-23 19:30:48 | 1012 |

These threatening events show HTTP 'GET' requests of a sensor website, where the attacker is looking for specific files within the website implementation. The background information for IP address 2057704624 (goldscape.net, a services firm in India) was:

Suspect IP: 2057704624.
    hostname: golfscape.net.
    rep: 79
    crime_id: 452
    sentenced: 2010-07-04 12:48:20
    publish: 0

Hegli et al., U.S. patent application Ser. No. 12/709,504, filed on Feb. 21, 2010, for System And Method For Generating A Reputation Vector For A Web Site, is hereby incorporated by reference in its entirety.

Harris, U.S. patent application Ser. No. 12/757,972, filed on Apr. 9, 2010, for System And Method For Performing Longest Common Strings Prefix Searches, is hereby incorporated by reference in its entirety.

Hegli, U.S. patent application Ser. No. 12/894,143, filed on Sep. 30, 2010, for Online Identity Reputation, is hereby incorporated by reference in its entirety.

Figure 7:
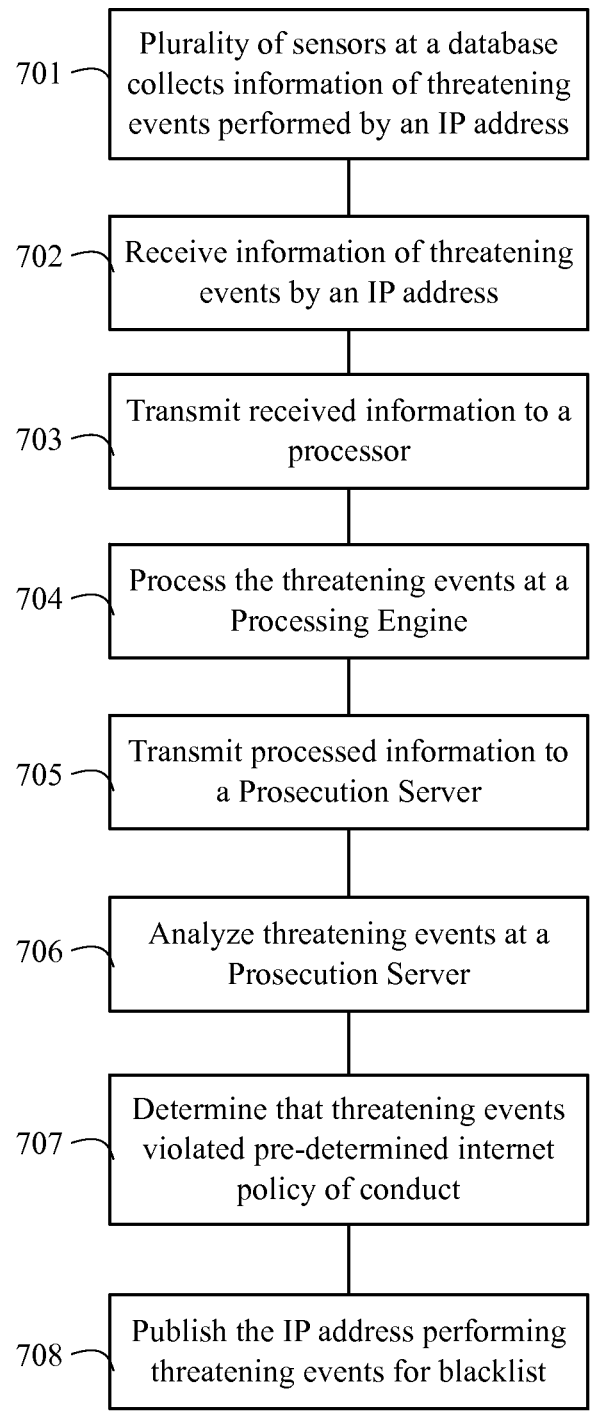
FIG. 7 is a flow chart for a method for identifying and prosecuting threatening IP addresses.

FIG. 7 is a flow chart of a method for identifying and prosecuting threatening IP addresses. At block 701, multiple sensors collect information concerning threatening events emanating from threatening IP addresses. At block 702, the threatening events data is received at a database, preferably stored in a cloud computing facility. At block 703, the threatening events data is sent to a processing engine. Preferably the processing engine is a map/reduce engine as discussed below. At block 704, the threatening events data is processed at the processing engine to generate processed information pertaining to threatening events performed by threatening IP addresses. At block 705, the processed information is sent to a prosecution server. At block 706, the prosecution server analyzes the processed information. At block 707, the prosecution server determines that an IP address has engaged in threatening events that violate a pre-determined Internet policy of conduct. At block 708, the IP address is published on a "blacklist" of IP addresses that perform threatening events that violate a pre-determined Internet policy of conduct.

Figure 8:
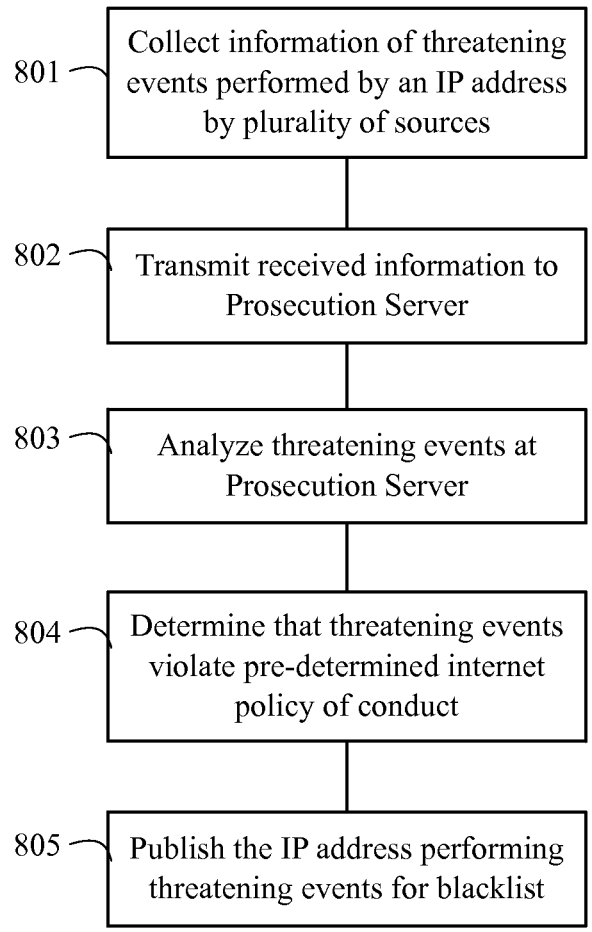
FIG. 8 is a flow chart for a method for identifying and prosecuting threatening IP addresses.

FIG. 8 is a flow chart of a method for identifying and prosecuting threatening IP addresses. At block 801, multiple sensors collect information concerning threatening events emanating from threatening IP addresses. At block 802, the received information is sent to a prosecution server. At block 803, the prosecution server analyzes the processed information. At block 804, the prosecution server determines that an IP address has engaged in threatening events that violate a pre-determined Internet policy of conduct. At block 805, the IP address is published on a "blacklist" of IP addresses that perform threatening events that violate a pre-determined Internet policy of conduct.

Figure 9:
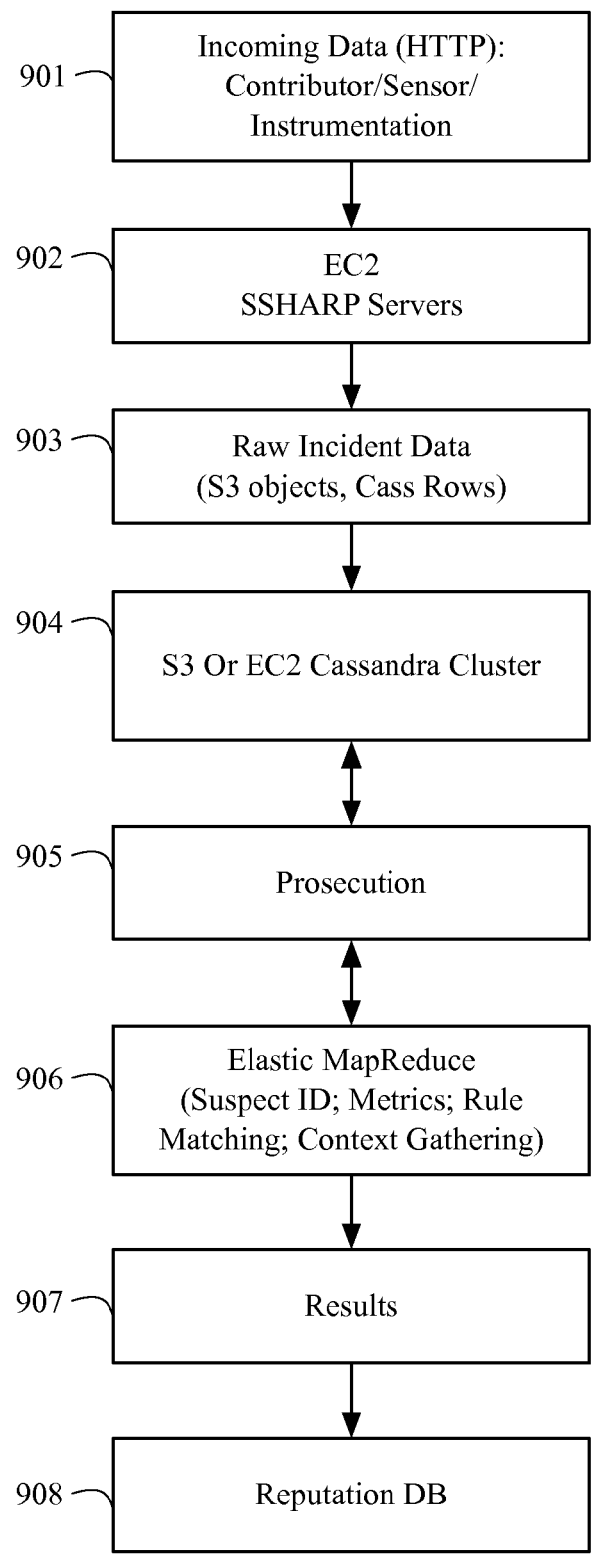
FIG. 9 is a flow chart for a method for identifying and prosecuting threatening IP addresses.
Figure 10:
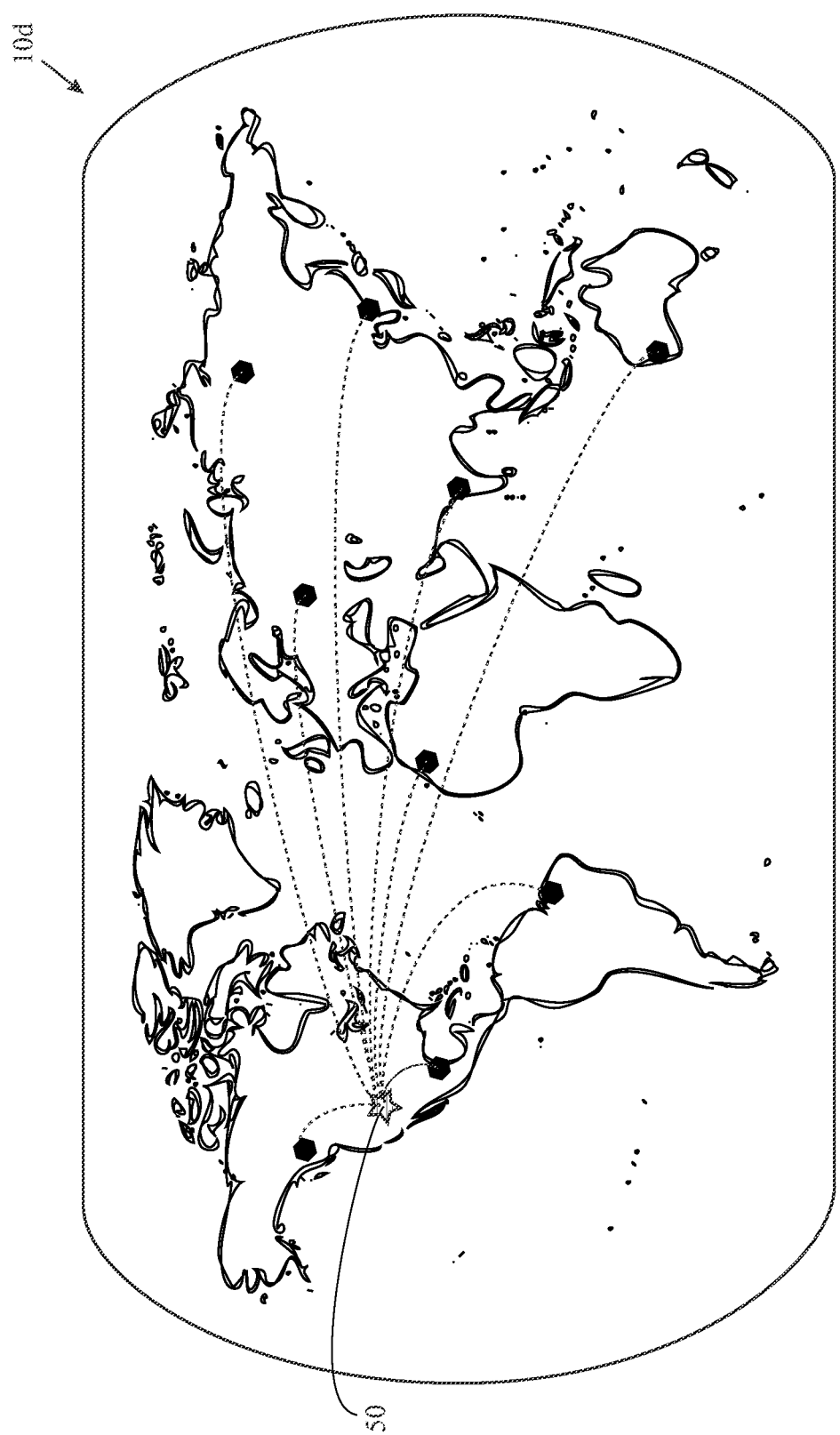
FIG. 10 is an illustration of the world with sensors sending data about threatening IP addresses to a system database.

FIG. 9 is a flow chart of a method for identifying and prosecuting threatening IP addresses. At block 901, threatening events data is sent in real-time from multiple sensors which monitor for threatening events emanating from IP addresses. At block 902 the data is received at SSHARP servers for processing. The SSHARP servers are APACHE application servers which receive threatening events observations via HTTP. At block 903 the raw threatening events data is stored at a S3 database in an object based (bucket based) storage of threatening events records. At block 904, sent from the S3 database. At block 905 and 906, the information is prosecuted by MapReduce engine which forms a prosecution cluster for analysis on the threatening events data received from storage. For a suspect ID aspect of the analysis, a MapReduce engine performs oriented analysis to identify suspicious actors within a set of new threatening events records, to determine: suspect IP address; first threatening event date/time; last threatening event date/time; and incident count. For a suspect prosecution aspect of the analysis, the MapReduce-oriented analysis applies metrics, heuristics, and statistics to observed threatening events to identify bad actors. The prosecution includes metrics calculation; rule/Heuristics matching; whitelist checking; context lookups—geography, reverse DNS, etc.; and quality assurance. At block 907, the results are generated and recorded. Next, at block 908 the results are sent to a reputation datastore which represents the minute-by-minute state of the 'threat landscape', the identification of actors and the assessment of their reputation FIG. 10 is an illustration of the world with a system 10d for identifying and prosecuting threatening IP addresses showing sensors transmitting information pertaining to threatening events emanating from IP addresses sent to a database 50.

Figure 11:
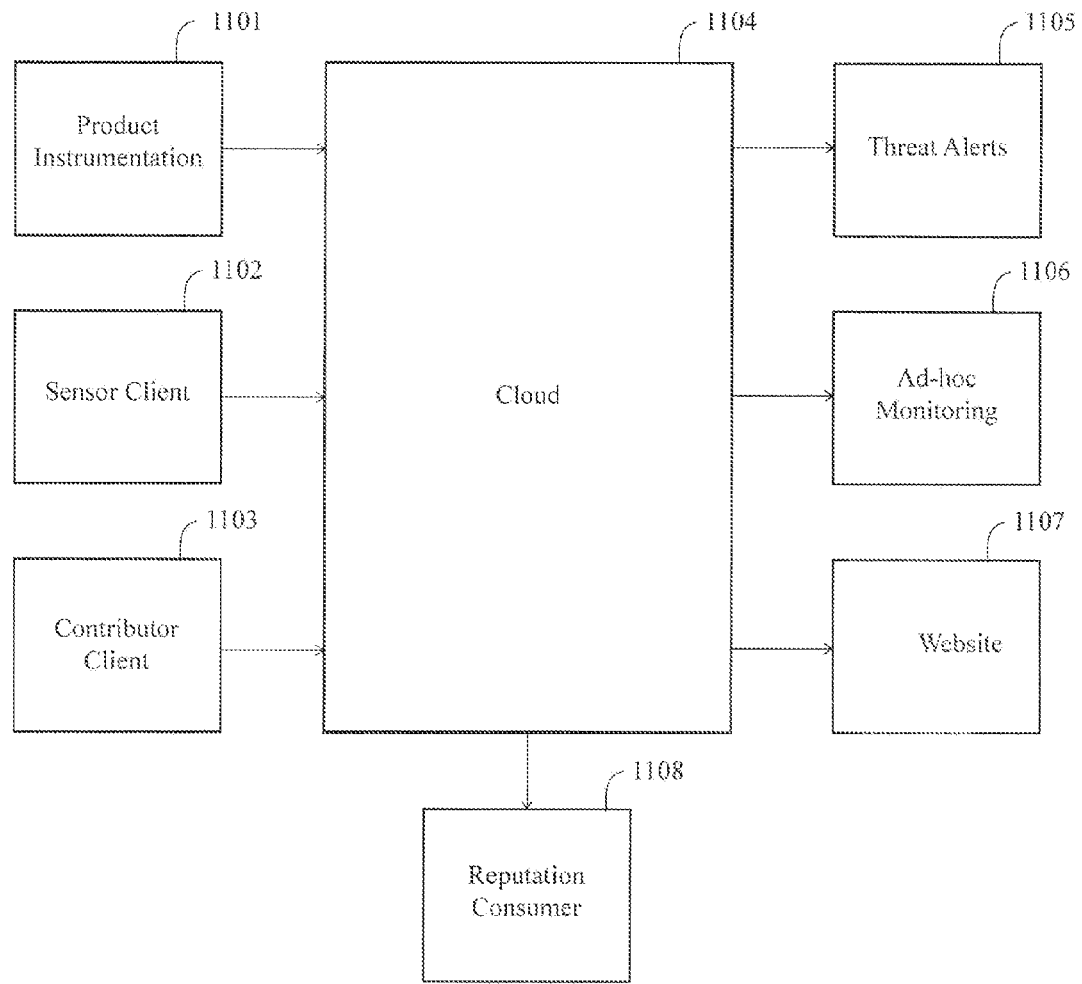
FIG. 11 is a block diagram of a system for identifying and prosecuting threatening IP addresses.

The present invention provides broad visibility into threat behavior across the Internet, and allows for analysis of that activity to produce actionable threat intelligence. This threat intelligence, in the form of reputation information about public endpoints, websites, and humans, is then leveraged by the community at large to make the Internet a safer place to interact and transact. The present invention seeks to identify all of the actors within the Internet, and characterize their behavior and their effects on the other actors. The present invention seeks to identify the behavior patterns between actors, and the attack vectors used by low reputation actors to commit criminal or simply annoying acts. The present invention seeks to maintain a database of all internet actors and their reputation. The present invention seeks to make the information about actors and their behaviors available for the advancement of science and the good of humanity. In order to perform these tasks, large volumes of data must be collected and analyzed. The data must be analyzed quickly and continuously to provide timely and accurate results. Large volumes of data must be stored, managed, and aged. Identification methods must continuously evolve as actors come and go, and their behaviors evolve. The present invention preferably comprises collection, analysis, and publishing components. A key design driver of the present invention is scale (or scalability), where both the key benefits and the key challenges come from the analysis of large volumes of activity data collected from contributors and sensors. A high level illustration of a system for identifying and prosecuting threatening IP addresses is shown in FIG. 11. FIG. 11 is a block diagram of a system for identifying and prosecuting threatening IP addresses. Product instrumentation 1101, sensor client 1102 and contributor client 110 provide raw threatening events data to the cloud component 1104. The cloud component 1104 is the cloud aspect which preferably consists of collection, analysis, and publishing components which are scaled horizontally to consume high volumes of raw incident data and produce actionable reputation data. The cloud component generates threat alerts 1105 for emerging alerts, ad-hoc monitoring 1106 and a Website 1107 for query interface. A reputation consumer 1108 is an accessible reputation service which provides the threat intelligence derived from the system to security applications and end-users.

Figure 12:
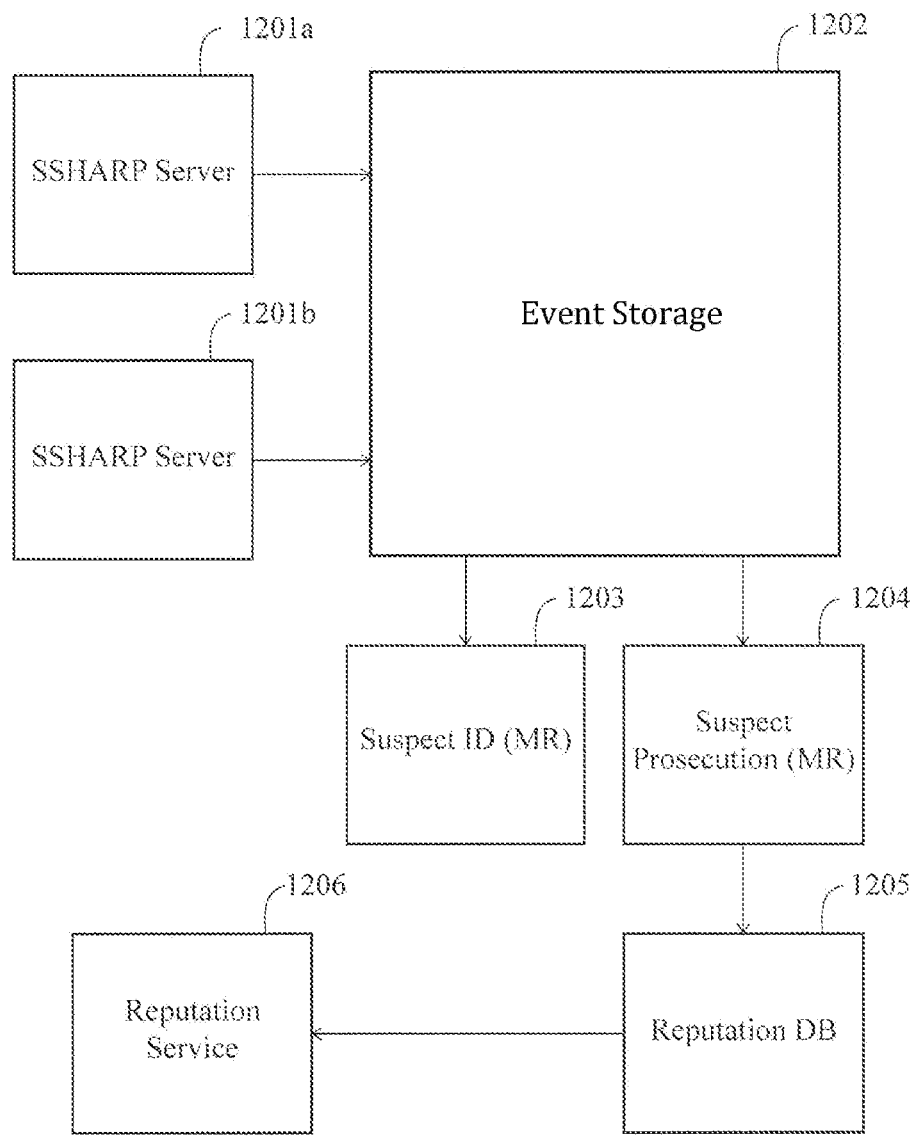
FIG. 12 is a block diagram of a system for identifying and prosecuting threatening IP addresses.

FIG. 12 is a block diagram of a system for identifying and prosecuting threatening IP addresses. SSHARP servers 1201a and 1201b transmitted threatening events data to an incident storage 1202. A suspect ID engine 1203 identifies threatening IP addresses from the data in the threatening events storage 1202. A suspect prosecution engine 1204 analyzes that raw threatening events data to generate results which are sent to a reputation database 1205. A reputation service 1206 provides the threat intelligence derived from the system to security applications and end-users.

Figure 13:
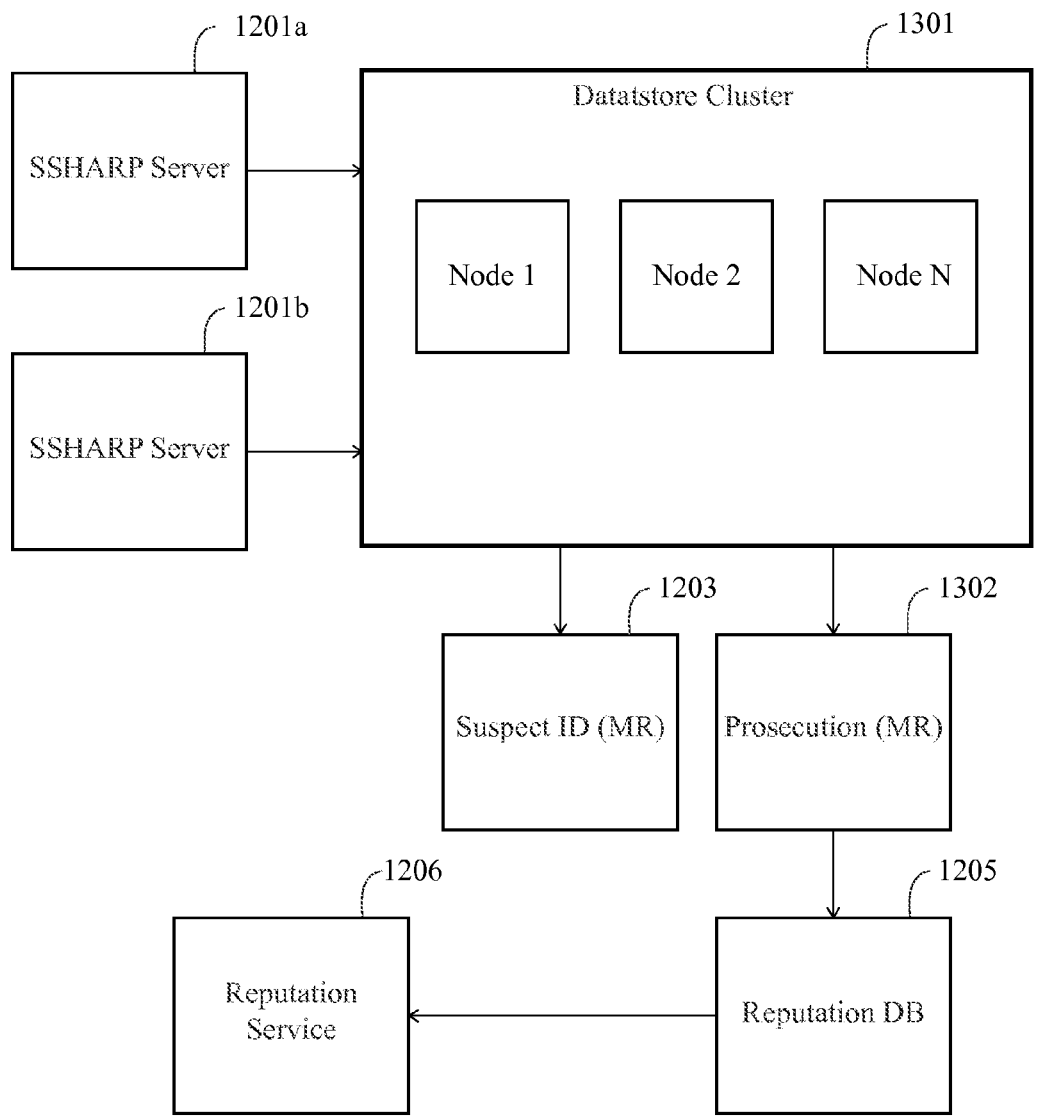
FIG. 13 is a block diagram of a system for identifying and prosecuting threatening IP addresses.

FIG. 13 is a block diagram of an alternative system for identifying and prosecuting threatening IP addresses. SSHARP servers 1201a and 1201b transmitted threatening events data to a datastore cluster 1301 such as a CASSANDRA datastore cluster. The threatening events are inserted directly into nodes 1, 2 . . . N of the datastore 1301. A suspect ID engine 1203 identifies threatening IP addresses from the data in the datastore 1301. A suspect prosecution engine 1204 analyzes that raw threatening events data to generate results which are sent to a reputation database 1205. A reputation service 1206 provides the threat intelligence derived from the system to security applications and end-users.

The preferred approach for use of SSHARP servers is the Resource Oriented Architecture to define REST-style Web Services. The REST philosophy is based on defining available resources via URI's (nouns), and the possible operations on those resources via HTTP methods (verbs). The general SSHARP URI format is: <service-root>/<incident-type-specific-component>{.json, xml}. The supported threatening events types are: File; Web (URL's, generally outbound); Network (IP's, generally inbound); Email (inbound and outbound spam, and related URL's, senders); and Threat Package (correlated collection of the other types).

The GET method is used to request data from the service. Based on query parameters, the data requested can be filtered by various attributes and by timeframe. The PUT method is used to create new records in the threatening events database. The POST method is used to append information to a threat package. An existing threat package ID is used to identify the package to be appended to.

Each threatening event type defines type-specific attributes. These attributes represent a description of the threatening event, and are a set of facts related to the threatening event that can be used for analysis. The use of these attributes within a REST-style system allows the supported attributes to be extended as available data and research needs evolve.

A single threatening event can be submitted by setting attribute values as part of the query string. Bulk threatening events can be submitted using PUT and a JSON or XML-formatted request body.

The SSHARP protocol can also be utilized for security data queries, using the GET method and the appropriate attributes for each record type. For example, using the network threatening event type described below, security records can be obtained using GET:
GET/threateningevents/network{.json, xml}?source_ip=<ip>.

IP threatening events are the base threatening event type. All other IP threatening events preferably include the required attributes of the base IP threatening event type. These threatening events represent both in-bound exploit attempts as well as outbound compromised behaviors, along with normal outbound end-user traffic. A network URI is used to send/receive network threatening events, referring to a variety of possible interactions with remote IP's, such as probes, port scans, and vulnerability exploits.

The intent is to identify the key attributes needed to identify and track threat IP's and to correlate threat IP activity with other types of threatening events. The attributes defined for network events represent a sort of 'base class', where all other incident types inherit these attributes, some of which are required, along with additional type-specific attributes.

HTTP incidents are specific HTTP protocol requests, using any HTTP method (GET, POST, etc.). Threatening events are analyzed for frequency, content type requested, reputation, method, and a variety of other attributes. HTTP threatening events are supersets of network threatening events, and all network threatening event attributes are valid for Web threatening events as well.

DNS threatening events track name lookups to allow analysis for anomalies and failure patterns, as well as use of unconfigured nameservers. The threatening events are a superset of general IP threatening events, and preferably include the required IP threatening event attributes.

An threatening event package is a collection of different or multiple threatening events that are part of the same attack or threat. This threatening event type represents pre-correlated incidents, as made possible by the source of the data.

Figure 14:
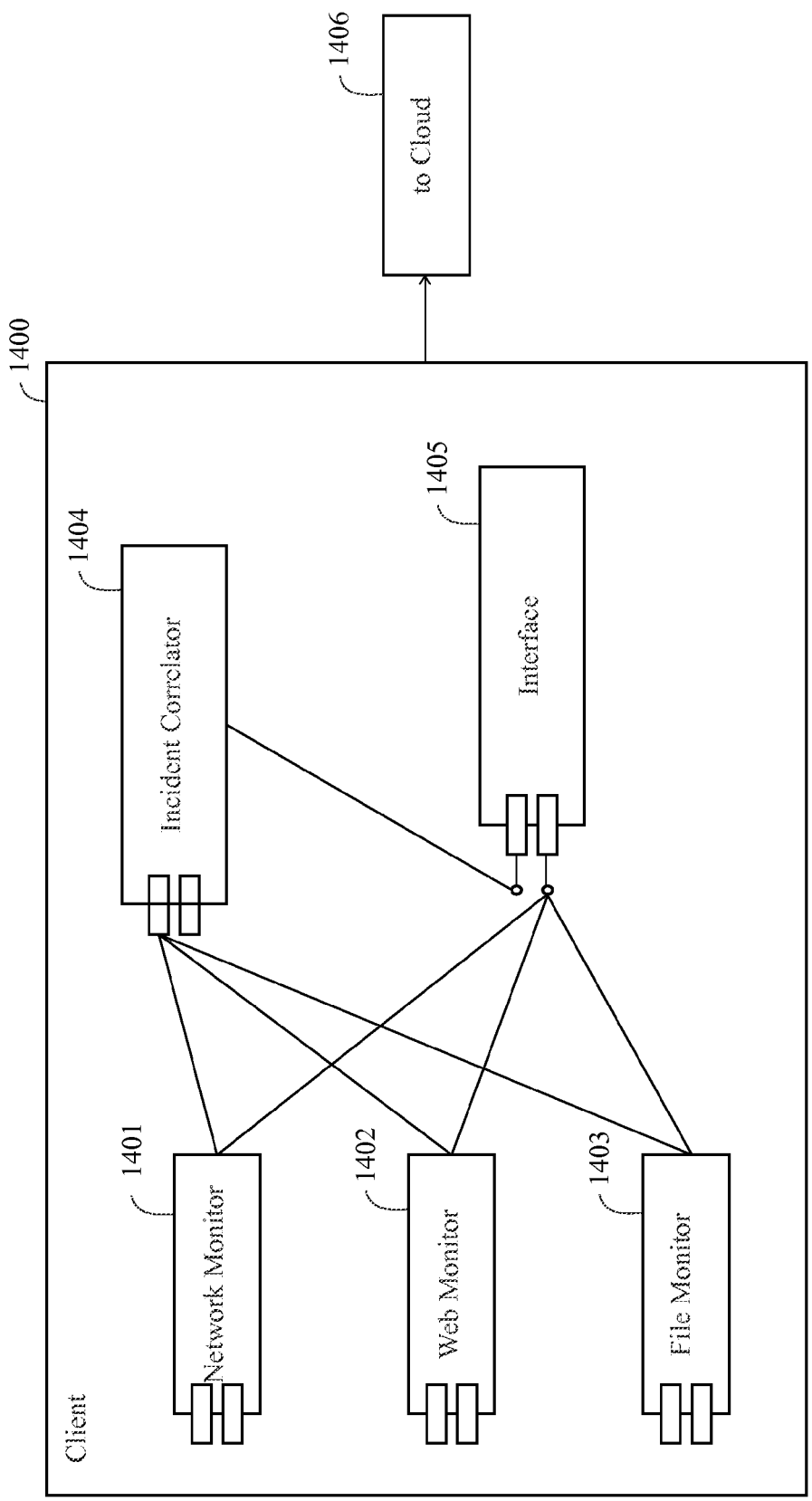
FIG. 14 is a block diagram of sensors transmitting data to a cloud database for a system for identifying and prosecuting threatening IP addresses.

FIG. 14 is a block diagram of a sensor transmitting data to a cloud database for a system for identifying and prosecuting threatening IP addresses. The sensor client 1400 preferably comprises a network monitor 1401, a web monitor 1402 and a file monitor 1403, which all send data to an incident correlator 1404 and an interface 1405. The interface transfers the raw threatening events data to the cloud component 1406 or the SSHARP servers.

Figure 15:
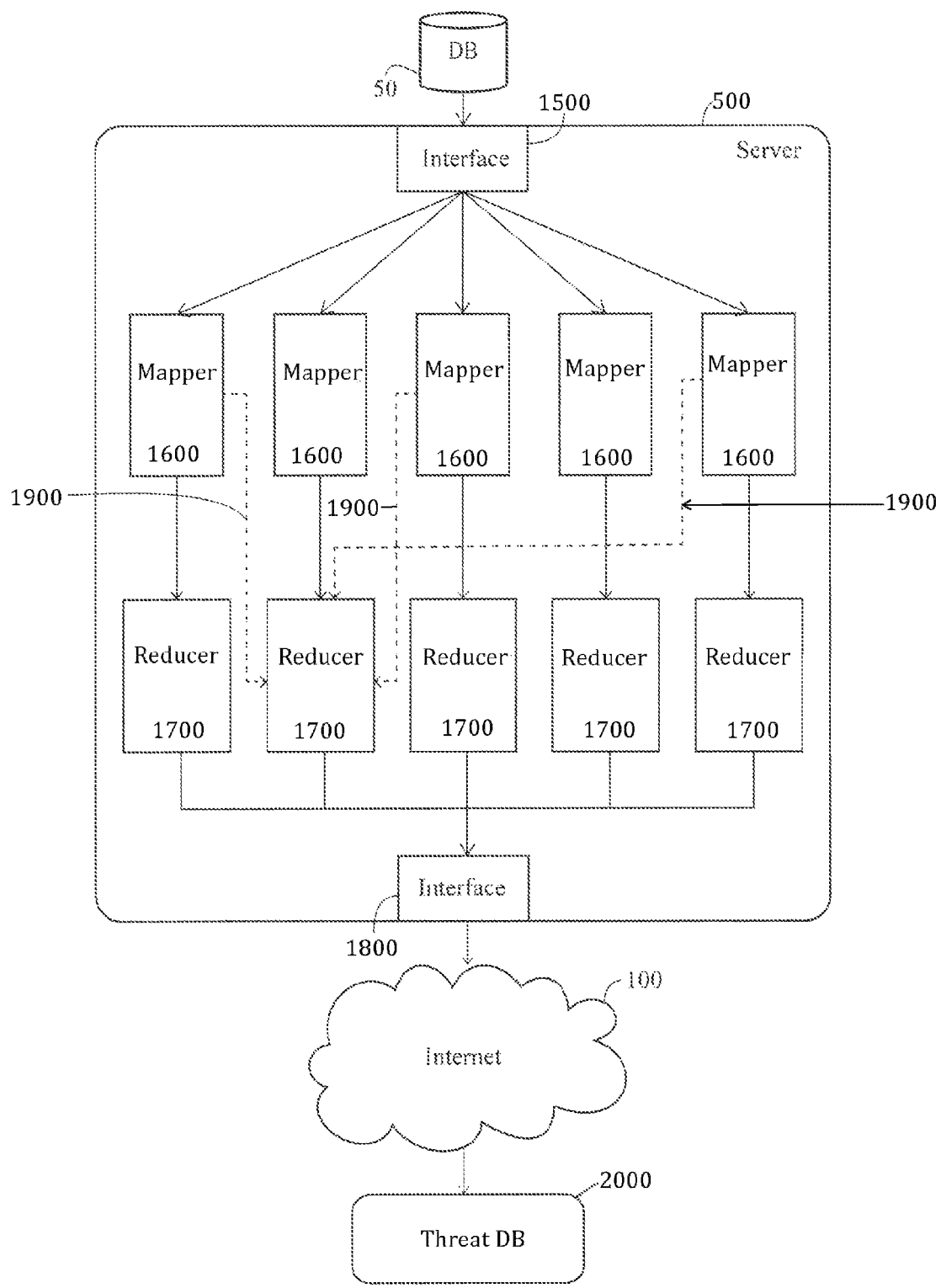
FIG. 15 is a block diagram of map/reducer engines of a system for identifying and prosecuting threatening IP addresses.

FIG. 15 is a block diagram of Map/Reduce engines of a system for identifying and prosecuting threatening IP addresses. Incident information from a database 50 is sent to Mapper 1600 of a server 500. The number of Mappers 1600 correspond to a cluster size for the information. The Mapper 1600 parse the data and sent parsed data to Reducer 1700 for further processing. All incident data for a specific IP address is sent to the same Reducer 1700 as shown by the dashed lines 1900. In this manner all of the threatening events data is preferably processed at a single Reducer 1700. Each Mapper and Reducer preferably runs on its own server, and it is the set of these servers that comprise the prosecution cluster. Also, the Reducers add data directly to the threat database, since they are the implementation of the prosecution. The processed data is sent to an interface 1800 of the server 500 and sent over the Internet to a threat database 2000 for further analysis.

A threat aging algorithm is utilized with the present invention to determine if threatening IP address should be paroled from the publication line. The threat aging algorithm is preferably performed for each of the threatening IP addresses published on the list of threatening IP addresses. The threat aging algorithm determines if an IP address should be removed by determining the threat performed by the threatening IP address, the time period on the list of threatening IP addresses, the completion of a publication period on a threatening IP addresses list by the threatening IP address, reoccurring behavior by the threatening IP address and volume of threatening events performed by the threatening IP address. If the listed IP address is no longer a threat, or no longer behaving threateningly, then the IP address is removed from the list of threatening IP addresses.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A method for identifying and prosecuting a threatening Internet Protocol (IP) address on the Internet, the method comprising:
   transmitting information to a server, the information comprising one or more events emanating from an IP address;
   analyzing the one or more events at a server;
   determining that the one or more events have violated a predetermined policy for conduct on the Internet;
   publishing the IP address on a list of threatening IP addresses to be blocked by users adhering to the predetermined policy for conduct on the Internet; and
   performing a threat aging algorithm for the IP address published on the list of threatening IP addresses to determine if the IP address should be removed from the list of threatening IP addresses, the threat aging algorithm comprising one or more of (i) determining a reoccurring behavior associated with the IP address and (ii) determining a volume of events performed by the IP address.

2. The method according to claim 1, further comprising collecting the information at a plurality of slave proxies controlled by a proxy master.

3. The method according to claim 1 further, comprising collecting the information at a plurality of client computers directed by a URL server.

4. The method according to claim 1, further comprising collecting the information at a plurality of honeypot computers.

5. The method according to claim 1, wherein the one or more events comprises an event associated with at least one of the following: (i) click fraud, (ii) malware, (iii) Trojans, (iv) Botnets, (v) one or more operating system exploit, (vi) SQL injection attacks, (vii) local file inclusion attacks, (viii) DDoS attacks, and (ix) dictionary attacks.

6. The method according to claim 1, further comprising determining that the IP address should be removed from the list.

7. The method according to claim 1, further comprising generating a reputation value for the IP address.

8. The method according to claim 1, further comprising:
   transmitting event data from a plurality of sensors to a database; and
   processing the event data at a Map/Reduce engine to generate a result for transmitting to a prosecution server.

9. The method according to claim 1, wherein analyzing the one or more events at the server comprises:
   comparing the IP address to a list of known non-threatening IP addresses; and
   determining a sub-domain count for a host name associated with the IP address, wherein the host name is obtained using reverse domain name system (DNS) of the IP address; and
   determining a reputation value for the IP address.

10. A system for prosecuting threatening Internet Protocol (IP) addresses on the Internet, the system comprising:
    a plurality of sensors for detecting incidents associated with one or more IP addresses and generating event data associated with the one or more IP addresses;
    a database for storing the event data generated by the plurality of sensors; and
    a server configured to receive the event data, determine if an Internet policy code has been violated by the incidents associated with the one or more IP addresses, publish the one or more IP addresses on a list of threatening IP addresses, and perform a threat aging algorithm for the one or more IP addresses published on the list of threatening IP addresses to determine if the one or more IP addresses should be removed from the list of threatening IP addresses, the threat aging algorithm comprising one or more of (i) determining a reoccurring behavior associated with the one or more IP addresses and (ii) determining a volume of events performed by the one or more IP addresses.

11. The system according to claim 10, wherein the plurality of sensors comprises at least one of a plurality of slave proxy computers controlled by a master proxy server, a plurality of client computers and a plurality of sensor computers positioned globally.

12. The system according to claim 10, further comprising an application server for receiving event data generated by the plurality of sensors prior to transmitting the event data to the database.

13. The system according to claim 10, further comprising a Map/Reduce engine for processing the event data to generate information on threatening events emanating from threatening IP addresses.

14. A method for identifying and prosecuting a threatening IP address on the Internet, the method comprising:
    detecting, at a sensor, an event associated with one or more IP addresses;
    generating event data for the event associated with the one or more IP addresses;
    transmitting the event data to an application server;
    transmitting the event data from the application server to a database;
    processing the event data at a Map/Reduce engine to generate threatening events information for one or more IP addresses;
    transmitting the threatening events information to a prosecution server;

analyzing the threatening events information at the prosecution server;

determining that the threatening events associated with the one or more IP addresses has violated a predetermined policy for conduct on the Internet;

publishing the one or more IP addresses on a list of threatening IP addresses to be blocked by users adhering to the predetermined policy for conduct on the Internet; and performing a threat aging algorithm for the one or more IP addresses published on the list of threatening IP addresses to determine if the one or more IP addresses should be removed from the list of threatening IP addresses, the threat aging algorithm comprising at least one of (i) determining a reoccurring behavior associated with the one or more IP addresses and (ii) determining a volume of events performed by the one or more IP addresses.

15. The method according to claim 14, wherein the event comprises an event associated with at least one of the following: (i) click fraud, (ii) malware, (iii) Trojans, (iv) Botnets, (v) one or more operating system exploits, (vi) SQL injection attacks, (vii) local file inclusion attacks, (viii) DDoS attacks, and (ix) dictionary attacks.

16. The method according to claim 14, further comprising determining that the one or more IP addresses should be removed from the list.

17. The method according to claim 14, further comprising:

using domain name system (DNS) to identify host names associated with the one more IP addresses; and leveraging a URL Reputation database to look up a reputation value representing a security risk assessment for the one or more IP addresses.

18. The method according to claim 14, further comprising comparing the one or more IP addresses to a list of known non-threatening IP addresses at the prosecution server.

19. The method according to claim 14, further comprising determining a sub-domain count for a host name for the one or more IP addresses, wherein the host name is obtained using reverse DNS of the IP address for each of the plurality of threatening IP addresses.

20. The method according to claim 14, further comprising using a reputation value, a sub-domain count, and a whitelist to determine if the one or more IP addresses should be published on the list of threatening IP addresses.

21. The method according to claim 14, wherein the Map/Reduce engine forms a prosecution cluster designed to scale to very high volumes of event data to perform prosecution of the events information for each of the one or more IP addresses.

\* \* \* \* \*